United States Patent

[11] 3,631,876

[72] Inventor Kenneth W. Misevich
 Fairfield, Conn.
[21] Appl. No. 857,900
[22] Filed Sept. 15, 1969
[45] Patented Jan. 4, 1972
[73] Assignee Remington Arms Company, Inc.
 Bridgeport, Conn.

[54] ACKNOWLEDGE-MONITOR LOGIC DEVICE WITH MEMORY
 7 Claims, 3 Drawing Figs.

[52] U.S. Cl. .................................................. 137/87,
 137/551, 137/625.18
[51] Int. Cl. ....................................................... G05d 11/00
[50] Field of Search ................................................. 137/87,
 625.18

[56] References Cited
 UNITED STATES PATENTS

| | | | |
|---|---|---|---|
| 1,815,474 | 7/1931 | Hickman | 137/625.18 X |
| 2,394,487 | 2/1946 | Rotter et al. | 137/625.18 |
| 2,858,851 | 11/1958 | Holl | 137/625.18 |
| 3,310,284 | 3/1967 | Inaba et al. | 137/625.18 |

*Primary Examiner*—Samuel B. Rothberg
*Assistant Examiner*—David J. Zobkiw
*Attorney*—D. Verner Smythe ABSTRACT: A fluid-operated logic device suitable for operating an annunciator system, or the like, which device has a bore with a piston valve member slidable therein. The piston has a transverse alert crossover to permit fluid flow between a constant pressure conduit and an alert conduit leading to an alert indicator. The piston is also provided with a crossover which permits communication between a conduit in which pressure increases in response to the detection of trouble and a monitor conduit leading to a monitor alarm. A conduit branches from the trouble conduit and is connected to the casing to act against the head end of the piston valve member. Upon an increase in pressure in the trouble circuit, the piston will be moved to the alert position where the alert alarm will be given until this condition has been acknowledged, the kinetic energy of the moving piston being employed. The piston is then returned to its normal position by an acknowledge arrangement, but should the trouble condition persist, the piston will return to and remain in its monitor position to indicate that the trouble condition has not been removed. When the trouble disappears, fluid pressure will move the piston to its normal position.

PATENTED JAN 4 1972 3,631,876
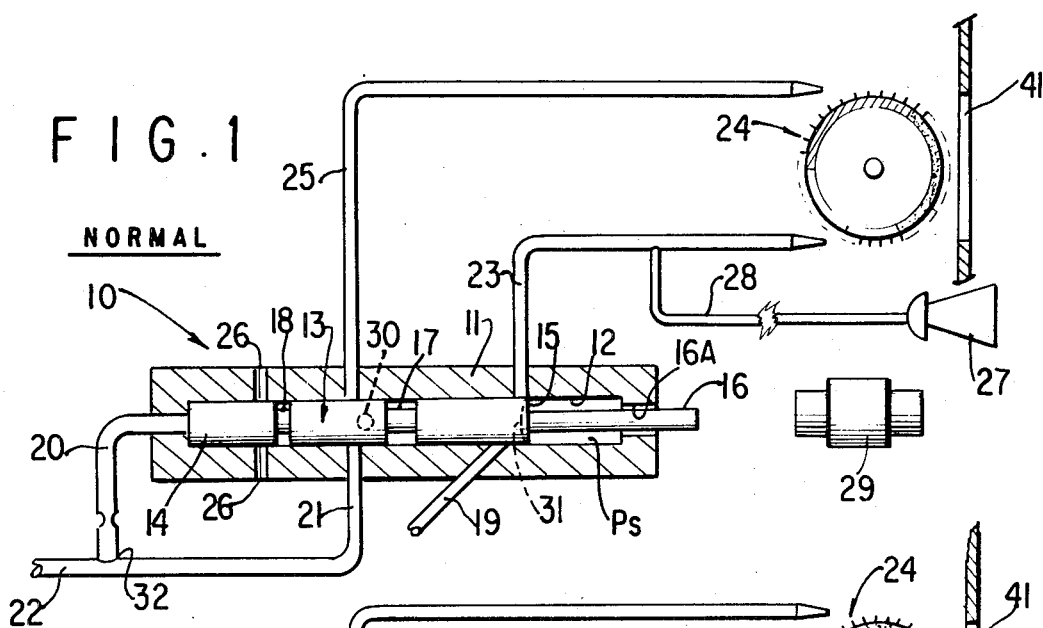
FIG.1 NORMAL
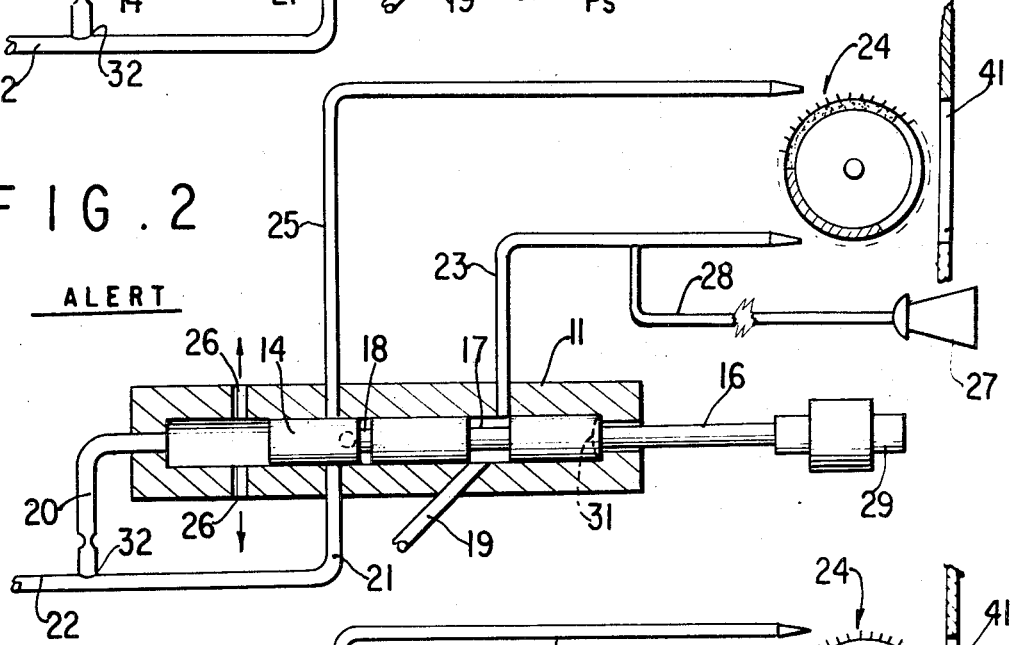
FIG.2 ALERT
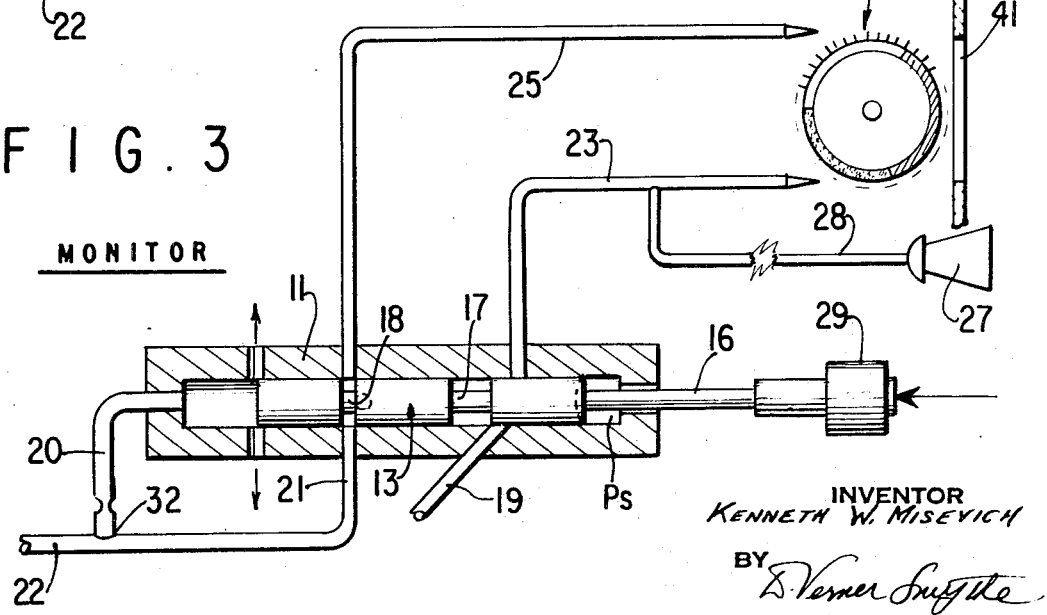
FIG.3 MONITOR
INVENTOR
KENNETH W. MISEVICH
BY D. Verner Smythe
ATTORNEY

ACKNOWLEDGE-MONITOR LOGIC DEVICE WITH MEMORY

Industrial control systems in many different industries have commonly used annunciators for providing information on a process or operation to an operator. A process or operation variable may have a limit or range predetermined as being acceptable for normal operation. If the variable or condition violates the limit or range, then the process is considered to be in an abnormal or trouble condition. Generally, the variable is measured by a suitable sensing device to produce an analog output that is a function of the value of the variable being monitored. When the variable violates the predetermined limit or range, a precision limit switch will transmit a signal to the annunciator. The presence of this signal denotes an abnormal condition and indicates trouble in the system. When a trouble signal is noted, the operator will generally acknowledge the existence of this signal and then take the necessary remedial steps which have been determined beforehand.

Such annunciator systems are generally electronic or electric in nature and have been constructed in modular form in order to provide for a large variety of annunciator sequences. However, for many industrial applications, fluid or pneumatically operated control devices are preferred. In such devices, the increase or decrease of fluid pressure in a conduit in response to a condition would be an indication of an abnormal condition. While the general functioning of an electronic system can be duplicated by fluid-operated elements, there does not exist at the present time a complete fluid operated annunciator system.

One of the objects of the present invention is to provide the basic logic for a fluid or pneumatically operated annunciator.

Another object of the present invention is to provide a fluid-operated annunciator device which indicates an abnormal condition and remembers that such a condition has occurred until the abnormal condition has been eliminated.

According to one aspect of the present invention, a fluid operated annunciator device may comprise a casing having a bore within, which may be cylindrical, with a first constant source of fluid pressure being connected to the casing. Second and third fluid pressure conduits or signal input conduits are connected to the casing and respond to an abnormal condition by an increase in pressure. Alert or first signal output and monitor or or second signal output conduit means are also connected to the casing. Slidably positioned within the bore is a valve or logic member slidably movable between normal, alert, and monitor positions in response to pressure variations in the second or signal input conduit. The valve member is provided with means for interconnecting the alter conduit and the first fluid pressure conduit when the valve member has been moved to the alert position in response to an increase in pressure in the second conduit. The valve member is further provided with means for interconnecting the monitor conduit and the third fluid pressure conduit after the valve member has been moved from the alert position and the abnormal condition still exists.

The alert and monitor conduits lead to suitable indicator means for indicating the alert and monitor conditions.

Proceeding Other objects, advantages and features of the present invention will be apparent from the accompanying description and drawings, which are merely exemplary.

In the drawings:

FIG. 1 is a longitudinal sectional view of an annunciator device according to the present invention showing the several fluid pressure input and output conduits connected thereto and the piston valve member in the normal position;

FIG. 2 is similar to that of FIG. 1 but shows the piston valve member in the alert position; and FIG. 3 is similar to that of FIG. 1 but shows the piston valve member in the monitor position.

Precedins next to the drawings wherein like reference symbols indicate the same parts throughout the various views, a specific embodiment of the present invention will be described in detail. Where the term "fluid" is used, it means pneumatic or liquid, but the invention is particularly useable in pneumatic systems.

As may be seen in FIG. 1, the annunciator device of the present invention is indicated generally at 10 and comprises a casing 11 having a bore 12 therein. Slidable mounted within the bore is a valve member in the form of a piston 13 having a head end 14 and a rod end 15 from which extends a rod 16 through an opening 16A in an end wall of the casing. The rod provides both a mechanical linkage to the exterior of the casing and also a venting resistance for the fluid in that end of the bore.

The piston 13 is provided with an annular groove or passage means 17 which provides an alert crossover and a second annular groove or passage means 18 which provides a monitor crossover. The alert crossover enables a flow of fluid to pass through the casing bore to actuate the alert alarm and the monitor crossover transmits the monitor signal to its alarm system. As will be subsequently pointed out, the geometry of the device prevents simultaneous actuation. The casing bore has several fluid inputs and outputs which mate with the piston configuration. A constant pressure fluid conduit 19 having a pressure greater than 15 p.s.i.g., for example, is connected to the casing at an angle of about 45° or less to the longitudinal axis of the piston and casing. The desirable actuation also could be accomplished by proper shaping of the crossover passage 17. For example, right-hand surface of 17 could be angularly disposed (not shown) relative to conduit 19 so as to urge piston 13 to the right.

A second or signal input conduit 20 connects to the head end of the casing to provide an entrance for the actuation pressure or abnormal condition signal. A third conduit 21 is connected to the sidewall of the casing and also admits actuation or signal pressure to the casing. Both conduits 20 and 21 branch from a single signal input conduit 22 through which sensed conditions are indicated by variations in fluid pressure in the measured variable.

Opposite conduit 19 is an alert or first signal output conduit 23 which leads to a suitable indicator indicated generally at 24.

A monitor or second signal output conduit 25 similarly extends from the casing but is opposite conduit 21 leading to an indicator 24. While the indicator illustrated in the present embodiment is essentially a cylinder having vanes acted upon by fluid coming from the respective conduits 23 and 24, other suitable fluid-responsive indicators may be employed.

The casing 11 is further provided with venting orifices 26 whose function will be described in connection with the operation of the device.

While the indicator 24 is essentially visual, an audio-indicator indicated generally at 27 may be connected by conduit 28 through the alert conduit 23. When the alert condition persists, both the visual indicator 24 and audio-indicator 27 will be actuated.

An acknowledge button or means 29, such as a pressure input, is provided which is engageable with the outer end of piston rod 16. The operator acknowledges the existence of the alert condition by pushing button 29 which in turn moves the piston rod a distance so that the piston is in the monitor equilibrium flow condition in a manner to be presently described.

The sequence of operation of the device as described above will be described as follows:

Normal Condition

The pressure at conduits 20 and 21 will be atmospheric and the pressure $P_a$ in the rod end of the casing will be a few p.s.i.g. The residual pressure from the alert supply conduit 19 will maintain the piston in the position as shown in FIG. 1. As an example, the only fluid consumption can be leakage between rod 16 and its opening 16A and through venting orifices 30. While it is possible to construct the device so as significantly to reduce the air consumption, some of this consumption is necessary to its operation. By keeping pressure $P_a$ at least several p.s.i.g., the position will be restored to the normal position after termination of the annunciator sequence.

Sequence Acutation—Abnormal Condition

When the variable being measured exceeds a predetermined pressure so as to open a pressure switch or to furnish an input signal, a pulse of fluid, which may be air at a pressure of the same order as the pressure in conduit 19, will enter conduits 20 and 21 through conduit 22. However, with the piston in the normal position as shown in FIG. 1, conduit 21 will be blocked so that all of the pressure increase or change will flow through conduit 20 against the head end of the piston to move the piston against the opposite smaller rod end pressure $p_s$. The diameter of the 16 may be reduced along a portion of its length to assist in the movement of the rod outwardly of the casing while the piston is being moved by the abnormal condition pulse of fluid.

The trouble signal pulse will drive the piston 13 without any change in operation until the end of the piston uncovers the vents 26. At this point the pressure in the head end of the casing bore 12 will begin to drop and the monitor signal flow path will be open with the alignment of crossover 18 with conduits 21 and 25. The piston has kinetic energy so that the piston continues to move through the equilibrium position to the other end of the chamber to the alert position as shown in FIG. 2.

In this position, alert crossover 17 becomes aligned with conduits 19 and 23 to open the alert signal path. With the alert signal path open, the flow of fluid pressure through conduit 19 at an angle relative thereto will urge the piston into the position shown in FIG. 2. The fluid will now flow through the alert conduit 28 to indicator 24. The piston will block the flow of fluid between conduits 21 and 25.

Alert Memory

The piston will remain in the alert position as shown in FIG. 2 with the trouble signal still on. Even if the trouble signal is eliminated and the head end of the casing bore returns to atmospheric pressure, the impact force of the alert flow from conduit 19 will maintain the piston in the alert position. At the same time, pressure $P_s$ will be reduced to atmospheric pressure by increasing the distance from conduit 19 to the end of the chamber, by undercutting the rod end of the piston as indicated at 31 so as to seal it against the end of the bore, and by reducing the diameter of the rod (not shown) along that portion of the rod length which is in the casing wall.

The device therefore functions to remember the actuation of a trouble signal.

Acknowledge, Trouble Gone

The operator acknowledges the alert condition by pushing the acknowledgment button 29. The button in turn pushes the piston rod a distance to place the device in the monitor equilibrium position. Return movement of the piston will turn off the alert flow through conduits 19 and 23. If the trouble signal has been eliminated at this time, then pressure $P_s$ will return the piston back to its normal position as shown in FIG. 1 and the sequence is completed.

Acknowledge, Trouble Persists

However, if the trouble should persist at the time of acknowledgment, then pushing in the piston rod will stop the alert flow and commence the monitor flow through conduits 21 and 25.

When the piston is in the monitor position, as shown in FIG. 3, the monitor crossover 18 will be aligned with conduits 21 and 25 and the head end of the piston just partially closes vents 26. The fluid flow through conduit 21 has met less resistance than that through conduit 20 by the introduction of appropriate resistance or a venturi at junction 32. A portion of the fluid in the head end of the casing is being vented through openings 26. Both of these circumstances will cause a drop in pressure at the head end of the casing so that this pressure will just about equal the rod end pressure $P_s$ which will build up upon acknowledgment.

The stability of the monitor position is brought about primarily in the variation of the venting through orifices 26. Should the piston move toward the rod end of the bore, the opening of vents 26 will increase so as to decrease the pressure at the head end of the casing and thereby increase the effectiveness of the casing and rod end pressure $P_r$. should the piston move in the opposite direction, vents 26 will be closed off completely, the flow through conduits 21 and 25 will be reduced and the head end pressure in the casing will quickly become greater relative to the rod end pressure $P_s$ to again restore the piston to the monitor position.

The piston will remain in the monitor position as shown in FIG. 3 as long as the trouble signal continues. When the trouble signal is removed, pressure $P_s$ will provide the only force acting upon the piston and the piston will, therefore, return to the normal position of FIG. 1. The sequence is then completed.

In another aspect, a "first out" feature can be used which requires that if the supply at conduit 19 is on, the pressure $P_s$ will be strong enough so that the piston can only attain the monitor position. This is achieved by appropriately balancing the flow with the resistances from conduit 19 to $P_s$ and $P_s$ to atmosphere. Thus, only the first trouble will act against the piston with no pressure at the other end. It will turn on the alert supply pressure according to the system circuitry and supply air to all the other conduits 19 in the system.

It is to be pointed out that the device disclosed herein operates only if outputs 23 and 25 are loaded. There must be a fluid flow through conduits 19 and 23 during the alert condition, and there should be a significant fluid flow through conduits 21 and 25 during the monitor condition.

Thus, it can be seen that the present invention discloses a fluid operated annunciator device which accurately performs the normal sequence of remembering a trouble signal, responding to acknowledgment of the trouble signal, and then monitoring the trouble signal until the trouble signal disappears. The basic device may be modified and supplemented so as to provide this basic sequence with various combinations of alarm types and reset actions so as construction to provide all of the desired secondary sequences.

It will be understood that various details of construciton and arrangement of parts may be made without departing form the spirit of the invention.

What is claimed is:

1. A fluid logic device for providing signals comprising: a casing, a single freely slidable piston means in said casing, a first signal output means and means for supplying fluid pressure to said first signal output means second signal output means and means for supplying fluid pressure to said second signal output means, said piston means controlling the fluid connections between said first and second signal output means and their respective means for supplying fluid pressure, said first and second signal output means being mutually exclusive, means for supplying an input signal for moving said piston means from a first position blocking said first and second signal output means to a second position connecting said first signal output means with its means for supplying fluid pressure, return means for moving said piston means in a direction opposite to the direction the piston means is moved by said input signal means to a third position connecting said second signal means with its means for supplying fluid pressure.

2. A logic device as claimed in claim 1 wherein said piston means is moved by kinetic energy past said second signal output means to said first signal output means when said piston means is moved by said signal input means.

3. A device as claimed in claim 2 wherein said piston means comprises a piston having a head and a rod end, with a rod on said piston extending outwardly of said casing.

4. A device as claimed in claim 3 wherein said first and second output means include first and second axially spaced annular grooves on said piston means thereon to define transverse passages across the casing.

5. A device as claimed in claim 3 wherein the casing has end and sidewalls and the input signal means includes a connection to the end wall of the casing and a connection to the sidewall of the casing, the means for supplying fluid pressure to the second signal output means includes said connection to the sidewall.

6. A logic device as claimed in claim 1 wherein said first signal output means provides an alert condition signal and the second signal output means provides a monitor signal.

7. A logic device as claimed in claim 6 wherein there is a fluid passage past said piston means between the means for supplying fluid pressure to said first signal output means and one end of said piston means, and said input signal is supplied to an opposite end of said piston means whereby equilibrium is obtained by balance of pressures between the two ends of the piston means during the time a monitor signal is existent.

* * * * *

UNITED STATES PATENT OFFICE
CERTIFICATE OF CORRECTION

Patent No. 3,631,876  Dated January 4, 1972

Inventor(s) Kenneth W. Misevich

It is certified that error appears in the above-identified patent and that said Letters Patent are hereby corrected as shown below:

Column 1, line 50, "alter" should be --alert--. Column 1, line 60, "Proceeding" should be deleted. Column 1, line 72, "Precedins" should be --Proceeding--. Column 2, line 74, "position" should be --piston--. Column 3, line 10, "$p_2$" should be --$P_s$--. Column 4, line 1, "the casing and" should be deleted. Column 4, line 1, "should" should be --Should--. Column 4, line 35, "construction" should be deleted. Column 4, line 44, comma (,) omitted after "means".

Signed and sealed this 20th day of June 1972.

(SEAL)
Attest:

EDWARD M. FLETCHER, JR.  ROBERT GOTTSCHALK
Attesting Officer  Commissioner of Patents